H. P. PETERSEN.
SPRING WHEEL.
APPLICATION FILED OCT. 16, 1909.
976,686.
Patented Nov. 22, 1910.
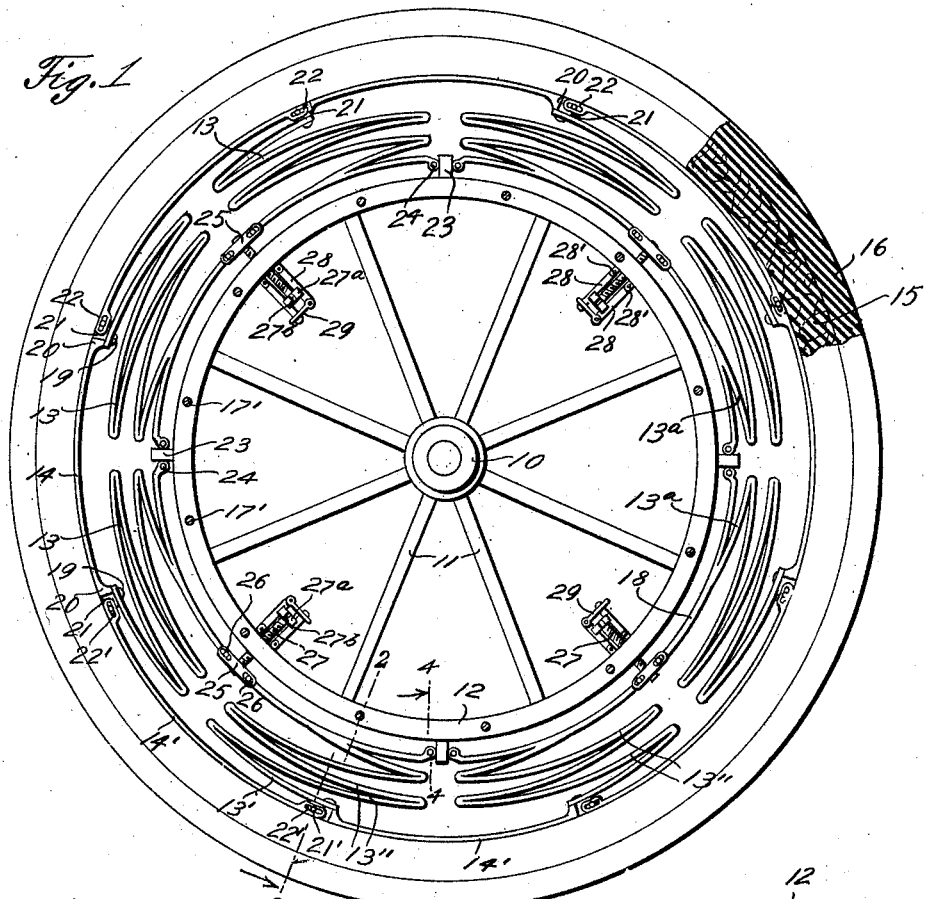
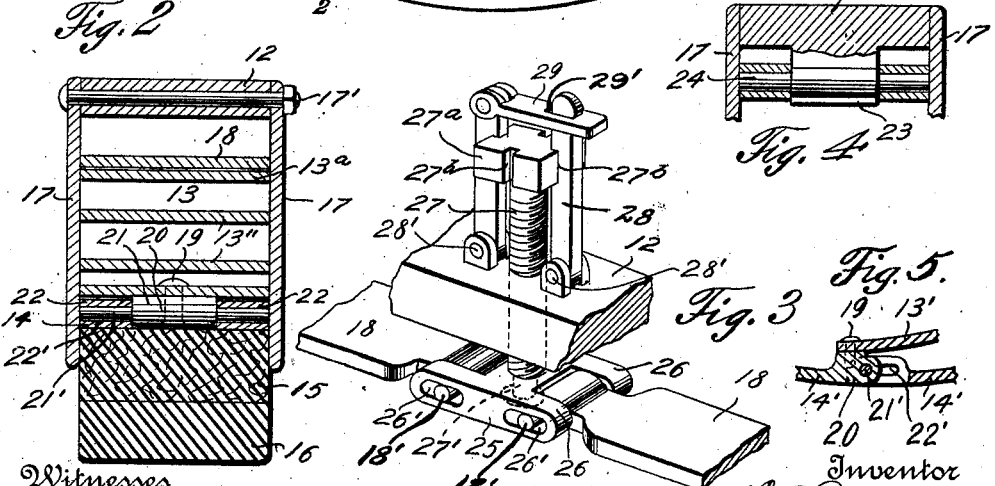
Witnesses
E. Larson
S. E. Dodge
Inventor
H. P. Petersen,
By Beeler & Cobb
Attorneys

UNITED STATES PATENT OFFICE.

HANS P. PETERSEN, OF SIOUX CITY, IOWA.

SPRING-WHEEL.

976,686. Specification of Letters Patent. Patented Nov. 22, 1910.

Application filed October 16, 1909. Serial No. 522,985.

*To all whom it may concern:*

Be it known that I, HANS P. PETERSEN, a subject of the King of Denmark, residing at Sioux City, in the county of Woodbury and State of Iowa, have invented certain new and useful Improvements in Spring-Wheels, of which the following is a specification.

This invention relates to resilient wheels for automobiles, bicycles or other vehicles, and the invention consists in certain specific novel features of construction hereinafter fully described and claimed and illustrated in the accompanying drawings, in which:

Figure 1 is an elevation of a wheel embodying the invention, one of the face plates being moved; Fig. 2 is a transverse section on the line 2—2 of Fig. 1; Fig. 3 is a detail perspective of one of the adjusting means; Fig. 4 is a transverse sectional detail on the line 4—4 of Fig. 1, and Fig. 5 is a detail of parts described below.

Throughout the following description and on the several figures of the drawings similar parts are referred to by like reference characters.

In order to avoid the necessity of employing a pneumatic tire or tube, as is so commonly now used and with accompanying danger and expense, the wheel of this invention is equipped with a series of springs located between the rim and the felly, said springs being of novel construction and serving to take the place of an interposed pneumatic tube.

The wheel illustrated comprises a hub 10, spokes 11, and felly 12, all of any suitable or well-known construction. Surrounding the felly are a series of springs 13 connected at their inner ends to the felly and at their outer ends to a segmental metallic band 14 connected in any suitable manner to the inner circumference of a rim 15. The rim 15 may be made of any suitable material, but preferably of some material which will be slightly flexible and yet be possessed of sufficient strength or rigidity to constitute a support for an outer flexible cushion 16. The springs 13 are inclosed from outside exposure, by means of plates 17 secured by fastening pins or bolts 17', to the felly 12. Each of the springs 13 is of a compound construction, being composed of a plurality of leaves connected each to each at their ends in a zigzag form as indicated in side view. The outermost leaf 13' of the spring is of approximately one half the length of the intermediate leaves 13'', and the innermost leaf 13ª is attached substantially midway of a plate 18, which may be also of flexible or spring material if desired. The leaf 13' at its outer end is connected by means of a rivet or bolt 19 to a head 20 constituting a portion of a hinged connection between two adjacent segments 14' of the aforesaid band 14. Said connection also includes a tongue 21 extending between a pair of ears 22 of the adjacent segment. A pivot pin 21' operates loosely in slots 22' of said ears, whereby the adjacent segments 14' may partake of slight longitudinal movement relative to each other due to compression of the wheel or its parts.

One end of each of the leaves 18 is connected to the felly by means of a lug 23 extending outwardly therefrom and either integral therewith or rigidly connected thereto in any suitable manner. The connection between said end of the leaf 18 and the lug 23 is by means of a fixed pivot 24. The other end of each of the plates or leaves 18 is connected to the felly adjustably by means of a block 25. The block 25 is provided with a pair of spaced ears 26 on each side, said ears having slots 26'. The end of the leaf 18 which extends between each pair of said ears 26 is provided with a pin 18' having loose connection therewith through said slots 26'. It will be seen that each block 25 constitutes a means for attachment of two adjacent ends of the plates or leaves 18. The block 25 has a central hole through which extends the shouldered portion 27' of an adjusting screw 27, said screw having threaded connection with the felly 12 in any suitable manner. Said shouldered portion of the screw is reduced and smooth for free rotation in said hole 25' of the block. The inner or headed end 27ª of the screw is provided with a series of parallel grooves or notches 27ᵇ, said grooves being parallel to the axis of the screw. The proper tension on the springs 13 is obtained by adjustment of the set of screws 27 in the manner indicated, and such adjustment is maintained during ordinary usage by locking means for the heads 27ª, said locking means for each screw comprising a pair of blades or links 28 pivoted at their inner ends at 28' to the felly on opposite sides of the screw. The pivots 28' are spaced apart a distance substantially equal to the distance between opposite grooves 27ᵇ and the inner or opposed edges of a pair of blades 28 are adapted to be seated in said opposite grooves 27ᵇ and locked therein by means of a link 29, pivoted to the outer end of one of the blades 28 and having a slot 29' to coöperate with the outer end of the other of said blades 28. The blades 28 therefore will constitute an effective lock preventing rotation of the screw regardless of the depth to which the said screw may have been adjusted.

Having thus described the invention what I claim as new is:

1. The hereindescribed wheel comprising a felly, a rim, a series of springs interposed between said felly and said rim, each of said springs including a plurality of connected leaves, one of the leaves being connected to the rim structure and another of the leaves being connected to the felly, and means for varying the tension of said springs, said means comprising a series of screws passing through the felly and each of which has an outward thrust against one of said springs at a point distant from the point of connection of the spring to the felly.

2. In a spring wheel, the combination of a felly, a rim, and sets of pairs of springs interposed between the felly and rim, said springs being connected to the rim structure and to the felly, and an adjusting means connected to each pair of said springs, said adjusting means including a block having a central hole and a screw passing through the felly and having shouldered connection through the hole of said block, substantially as set forth.

In testimony whereof I affix my signature in presence of two witnesses:

HANS P. PETERSEN.

Witnesses:
J. S. NELSON,
H. C. GARDINER.